United States Patent
Belgi et al.

(10) Patent No.: US 12,530,469 B2
(45) Date of Patent: Jan. 20, 2026

(54) AUTOMATED MULTI-PHASE INVESTIGATION OF SECURITY INCIDENT ALERTS USING A LARGE LANGUAGE MODEL (LLM) WITH CONVERGING DIALOGUE

(71) Applicant: VARONIS SYSTEMS, INC., New York, NY (US)

(72) Inventors: Amir Belgi, Ra'anana (IL); Ron Sneh, Atlit (IL); Lior Chen, Tel Mond (IL)

(73) Assignee: VARONIS SYSTEMS, INC., New York, NY (US)

(*) Notice: Subject to any disclaimer, the term of this patent is extended or adjusted under 35 U.S.C. 154(b) by 62 days.

(21) Appl. No.: 18/622,946

(22) Filed: Mar. 31, 2024

(65) Prior Publication Data
US 2025/0307419 A1    Oct. 2, 2025

(51) Int. Cl.
G06F 21/57    (2013.01)

(52) U.S. Cl.
CPC ...... *G06F 21/577* (2013.01); *G06F 2221/034* (2013.01)

(58) Field of Classification Search
None
See application file for complete search history.

(56) References Cited

U.S. PATENT DOCUMENTS

| | | |
|---|---|---|
| 2002/0059078 A1 | 5/2002 | Valdes |
| 2012/0096549 A1 | 4/2012 | Amini |
| 2018/0020021 A1 | 1/2018 | Gilmore |
| 2020/0401696 A1* | 12/2020 | Ringlein ............... G06F 21/552 |
| 2023/0086863 A1 | 3/2023 | Silberman |
| 2023/0315856 A1 | 10/2023 | Lee |

(Continued)

FOREIGN PATENT DOCUMENTS

WO    WO-2025064529 A1 *    3/2025    ............ H04L 51/04

(Continued)

OTHER PUBLICATIONS

Written Opinion of the International Searching Authority in the corresponding PCT application, serial No. PCT/IB2025/052509, dated May 16, 2025.

(Continued)

*Primary Examiner* — Michael Pyzocha
(74) *Attorney, Agent, or Firm* — AlphaPatent Associates Ltd.; Daniel J. Swirsky (57) ABSTRACT

Automated multi-phase investigation of security incident alerts using a Large Language Model (LLM) with converging dialogue. A computerized system receives a Security Alert Message pertaining to a possible security-related incident pertaining to an organization. The system automatically evaluates whether the Security Alert Message is either (I) a False Positive security alert message or (II) a True Positive security alert message, by performing an iterative multi-phase converging process in which the LLM evaluates at least: (i) the content of that Security Alert Message, and (ii) the meta-data of that Security Alert Message, and (iii) organizational context that is related to that Security Alert Message. An iterative process is performed by the LLM, which utilizes an Agent Module to fetch additional context information from organizational sources. The LLM re-updates the Risk Score and re-evaluates the Risk Score until convergence to a decision.

13 Claims, 3 Drawing Sheets

(56) References Cited

U.S. PATENT DOCUMENTS

| | | |
|---|---|---|
| 2023/0344869 A1 | 10/2023 | Jakobsson |
| 2024/0045990 A1 | 2/2024 | Boyer |
| 2024/0086271 A1 | 3/2024 | Neystadt |
| 2024/0111858 A1 | 4/2024 | Neystadt |
| 2024/0303348 A1* | 9/2024 | Bagg .................... G06F 21/554 |
| 2025/0103722 A1* | 3/2025 | Mccann ................. G06F 40/40 |
| 2025/0131089 A1* | 4/2025 | Gangwani ............. G06F 21/577 |
| 2025/0150377 A1* | 5/2025 | Vasseur ................. H04L 41/16 |
| 2025/0211551 A1* | 6/2025 | Danino .................. H04L 51/02 |

OTHER PUBLICATIONS

International Search Report in the corresponding PCT application, serial No. PCT/IB2025/052509, dated May 16, 2025.
Dinh Huong Nguyen et al., "False Alarm Reduction Method for Weakness Static Analysis Using BERT Model", Appl. Sci. 2023, 13(6), 3502; published on Mar. 9, 2023; obtained on Jun. 6, 2025 from: www.mdpi.com/2076-3417/13/6/3502.

\* cited by examiner

AUTOMATED MULTI-PHASE INVESTIGATION OF SECURITY INCIDENT ALERTS USING A LARGE LANGUAGE MODEL (LLM) WITH CONVERGING DIALOGUE

FIELD

Some embodiments are related to the field of computerized systems.

BACKGROUND

A large corporation, organization, or other entity may have thousands of team-members who utilize computing devices for various purposes; for example, to send and receive electronic mail, to engage in video calls, to browse the Internet, to compose documents, to access data repositories, or the like.

An end-user of an electronic device, and particularly a network administrator, may receive hundreds of incoming messages per day, from numerous recipients, with regard to a variety of topics.

SUMMARY

Some embodiments include systems, devices, and methods for automatically investigating an incoming security-related alert; by automatically generating an alert-specific playbook and then automatically calculating an initial risk score to a specific alert, and then updating the risk score automatically and iteratively using a Large Language Model (LLM) until the system is able to determine whether the alert's risk score is below a first particular threshold value (low risk, can discard the alert), above a second particular threshold value that (high risk, trigger one or more actions), or requires human evaluation to further decide (e.g., allowing the human to provide feedback and enabling the system to continues automatically and iteratively).

Some embodiments provide automated multi-phase investigation of security incident alerts using a Large Language Model (LLM) with converging dialogue. For example, a computerized system receives a Security Alert Message pertaining to a possible security-related incident pertaining to an organization. The system automatically evaluates whether the Security Alert Message is either (I) a False Positive security alert message or (II) a True Positive security alert message, by performing an iterative multi-phase converging process in which the LLM evaluates at least: (i) the content of that Security Alert Message, and (ii) the meta-data of that Security Alert Message, and (iii) organizational context that is related to that Security Alert Message. An iterative process is performed by the LLM, which utilizes an Agent Module to fetch additional context information from organizational sources. The LLM re-updates the Risk Score and re-evaluates the Risk Score until convergence to a decision.

Some embodiments may provide other and/or additional benefits and/or advantages.

DETAILED DESCRIPTION OF SOME DEMONSTRATIVE EMBODIMENTS

The Applicant has realized that a user of an electronic device, and particularly a system administrator or a member of an Information Security team, may receive numerous incoming alert messages, such as email messages and/or SMS text messages, that alert the user to a possible risk or threat or attack towards a system or towards an electronic device of the user or towards an account of the user or towards an organizational resource.

The Applicant has realized that many users lack the time or the knowledge to review such incoming alert messages, or to distinguish among, for example: (i) a correct alert message that is correct and should be acted upon, or (ii) a false-positive alert message that incorrectly estimates an operation as being attack-related while it is not actually attack-related, or (iii) a correct alert message that indeed reflects an attack-related operation but need not be acted upon (e.g., since the attack was already blocked, or the attack cannot be completed because of a protection mechanism), or (iv) an alert message that should be evaluated by using a larger context that takes into account data and/or meta-data related to the suspicious activity and/or related to previous (or subsequent) alert messages or suspicious operations. For example, realized the Applicant, a security alert may be received by a system administrator, indicating that User Adam has just accessed a file named "Confidential Financial Data.xlsx", located in the folder "Management\CFO\revenue"; and a correct evaluation of this alert, and a decision whether it is a threat or a legitimate operation, may require particular information, such as: who is this user; is he an employee, a consultant, a client, a supplier, an unknown third-party; how long is this user in or with the organization; what device was used for this particular access; what device(s) was/were used by that user for previous accesses to this file or to this folder; is the Internet Protocol (IP) address of the accessing user known to be within the organization or trusted, or conversely known to be attack-related; which other users typically access this file or folder, and what are their organizational relation to this specific user; and/or other information items that can provide a context for investigation and evaluation of this alert.

The Applicant has further realized that an administrator or manager of an organization or corporation or enterprise having thousands of end-users, may receive dozens or even hundreds or thousands of such alert messages per day or per week, with regard to legitimate and non-legitimate activities that were performed (or were associated with) a variety of electronic devices of such numerous end-users and/or with a variety of on-premises and cloud-based organizational resources (e.g., servers, repositories, databases). The Applicant has also realized that such Administrator, or similarly a member of an Information Security team, may receive numerous incoming alerts per day, and it is time-consuming and effort-consuming for humans to deeply investigate and to correctly evaluate each such alert; and many of such alerts may require immediate or rapid decision on them in order to prevent damage or security breaches. The Applicant has further realized that a correct analysis and evaluation of each alert may require particular up-to-date knowledge and/or expertise; and may further require a particular context in order to perform a rapid evaluation, as a true high-risk alert may require a correct evaluation and preventive measures within a very short time-frame.

Such administrator or manager, realized the Applicant, may lack the time and/or the knowledge to correctly investigate and evaluate such incoming alert messages. For example, with regard to time resources, realized the Applicant, in many situations an alert may require immediate or rapid evaluation, since a human attacker or an automated attacker may cause significant damage to organizational resources or may compromise confidential data if an attack is not rapidly detected and stopped or mitigated. Similarly, realized the Applicant, with regard to the knowledge requirement, a correct evaluation of an alert may require familiarity with multiple bodies of knowledge, including (i) security related/threat related knowledge and expertise, and also (ii) contextual information about the user, the device, the organizational resource, peer users, and other context information. Accordingly, realized the Applicant, such administrator may lack the sufficient time and/or the full knowledge to properly decide which alerts are correct and which are false-positive errors; or to evaluate or decide whether a particular alert should be regarded as a high-risk alert or (conversely) can be discarded; or to evaluate whether a particular alert should be regarded as a true-positive alert or as a false-positive error; or to evaluate whether a particular alert indeed points to a high-risk event or activity or threat; or to evaluate which correct alert message should be acted upon and which other correct alert message can be ignored since a protection mechanism is in place; or to evaluate which protection mechanism(s) to apply or not to apply in response to a particular alert message; or to evaluate an alert message by taking into account data and/or meta-data that needs to be collected and investigated from a current suspicious activity as well as from previous and/or subsequent activities of the same user or of other user(s) or of the same electronic device or of other electronic device(s).

The Applicant has realized that the field of threat detection is challenging and dynamic, typically requiring a high level of expertise and quick adaptation to new threat scenarios. However, realized the Applicant, there is a gap between the demand and supply of skilled personnel who can effectively evaluate and properly act on security alerts.

The Applicant has realized that some conventional systems attempt to provide partial assistance in threat investigation, in a limited manner. For example, realized the Applicant, such conventional systems are static and do not connect to dynamically-changing and dynamically-updating organizational data-sources. Furthermore, realized the Applicant, conventional systems do not emulate a human systematic phased approach in problem-solving, which is important and useful for investigating and resolving threats.

The Applicant has further realized that there are several factors that contribute to the difficulty of this problem: (a) High number of alert messages per day or per week, resulting in an error-prone and time-consuming investigation process that can lead to fatigue and/or to in correct evaluation results, particularly when a high number of "false positive" alert messages are involved; (b) The variety of different types of security alerts, each type often requiring a different type of investigation process, analysis, and/or knowledge; (b) Organizational knowledge gap, such that the person that performs the investigation may lack particular knowledge about the related/relevant/affected users and/or end-user devices and/or organizational assets.

The Applicant has realized that it may be beneficial to provide automated systems and methods that can autonomously review and investigate such incoming alert messages or alert signals, or such already-generated or received alert messages or alert signals; and that can automatically and autonomously collect or gather data and/or meta-data, from the same electronic device/user account and/or from other electronic devices/user accounts in the same organization/enterprise and/or from other data repositories or information sources of the organization/enterprises; and to automatically and autonomously generate at least a Risk Score that indicates the evaluated or estimated risk level (or threat level) that was automatically generated for that alert, optionally accompanied by an automatically-generated report, written in a natural language (e.g., English) that the user or the administrator can read and understand, providing the automatic investigation results as well as one or more mitigation operations that may or can or should be performed. In some embodiments, such automatically-generated Risk Score and optionally also a supporting report narrative, may further be accompanied by a generated code or code-portion, or by a generated signal or message, that trigger or cause the automatic invocation of such mitigation operations (e.g., quarantining of an email message; disconnecting a device from a network; forcing a password reset for a particular account; forcing a remote log-off or log-out for a particular account; triggering a request to perform a secondary or additional authentication or log-in; or the like).

Some embodiments provide an automated method and an automated system for autonomous investigation/evaluation/assessment/analysis of incoming or received or generated security alert messages or security alert signals; utilizing a Large Language Model (LLM) that is configured to generate an alert-related or threat-related playbook to and iteratively calculate or determine an alert confidence level or an alert confidence score, and to autonomously ask for (and obtain, and then re-use) additional context information. The process continues automatically until convergence to a resolution, and/or for a pre-defined number of investigation iterations, and/or for pre-defined time period of investigation, and/or until one or more pre-defined conditions are met and a resolution is generated.

Figure 1:
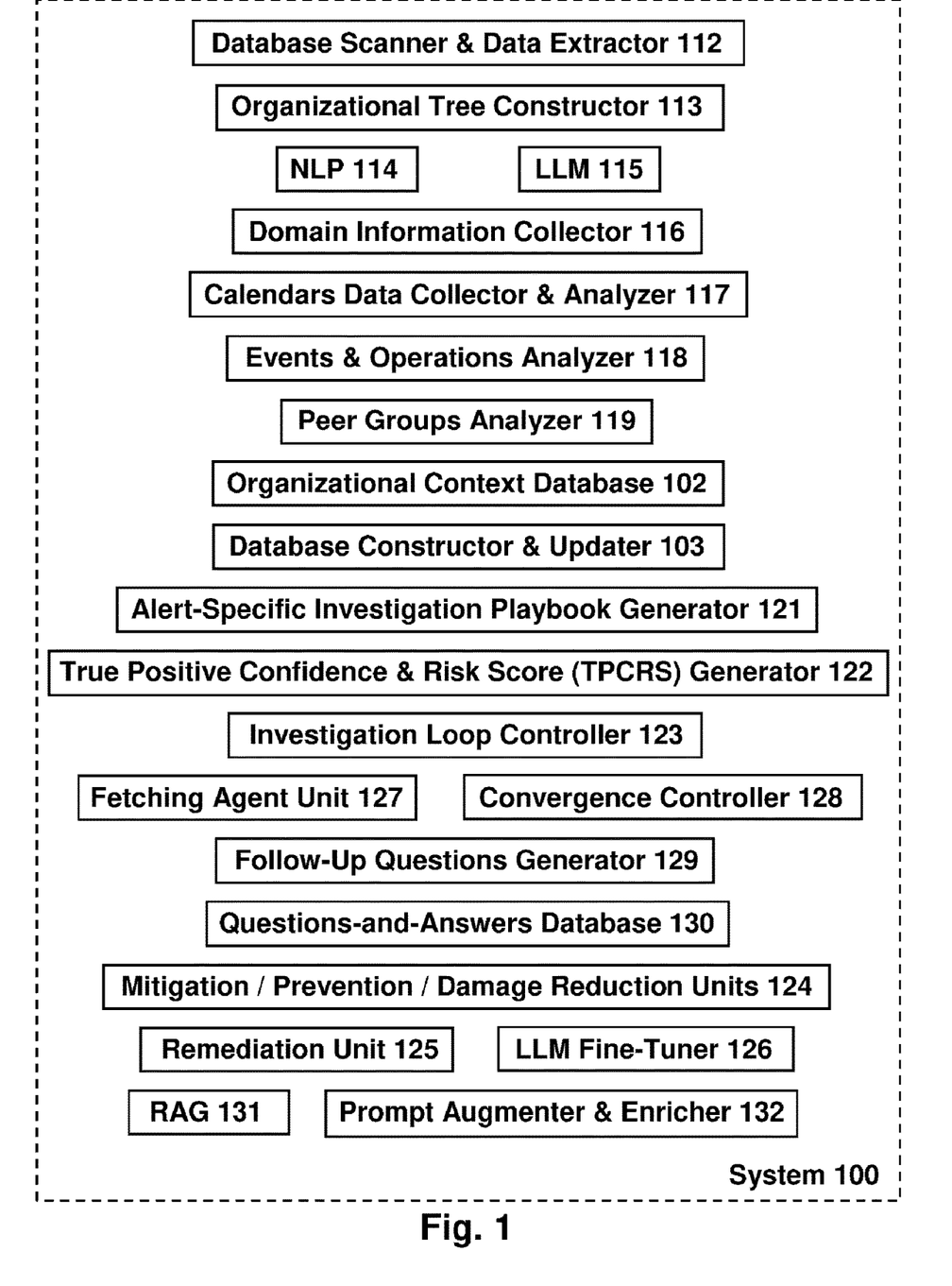
FIG. 1 is a schematic block-diagram illustration of a system, in accordance with some demonstrative embodiments.

Reference is made to FIG. 1, which is a schematic block-diagram illustration of a system 100, in accordance with some demonstrative embodiments.

In accordance with some embodiments, an initial step in the automated method is collection of data from a plurality of resources, and construction of one or more datasets of databases that would then be utilized for automatic investigation of security alerts. This step further includes the periodical updating of such datasets or databases; for example, once per day, once per week, once per month; on demand, in response to an "update now" command; in response to a triggering event, such as the introduction or the addition of a new organizational repository; or the like. Accordingly, an Organizational Context Database 102 is constructed (and is updated) from all the following sources by a Database Constructor & Updater 103.

The step of collecting data and constructing the database may include, for example, operations of extracting and/or collecting and/or deducing data (e.g., using a Database Scanner & Data Extractor 112) from user identity databases or providers, user reputation database or providers, sender reputation database or providers, email address reputation databases or providers, Internet Protocol (IP) address databases or providers, a Customer Relationship Management (CRM) system or application, a Supply Chain Management (SCM) system or application, an Enterprise Resource Planning (ERP) system or application, and/or other information sources; including, but not limited to, scanning or searching any available internal (in-company) databases and/or external databases and/or private databases and/or public databases and/or proprietary databases; Microsoft Active Directory (AD), Azure Active Directory (AAD), Okta databases, Salesforce databases, Hubspot databases, Microsoft Dynamics 365, a formal or informal Organizational Directory (e.g., maintained or provided by Human Resources (HR) or by other entity), formal or informal list(s) of Contacts that each user or user-account in the organization maintains (e.g., extracted or obtained from an email application or an email account of each user, and/or from electronic devices utilized by each user), or the like.

In this step, users' information is extracted, such as (per each user) its name, its username, its Organizational Unit (OU), organizational department (e.g., legal, marketing, operations), organizational team-identifier, organizational title or role (e.g., CFO, CTO, PM, developer, assistant), email address, direct manager(s), indirect manager(s), known subordinates, and/or other data. This step may further include deducing or determining group(s) within the organization, and determining which users are members of which group(s). This step may further include constructing an Organizational Structure Tree, that reflects the information that was collected and/or extracted and/or deduced and/or determined as mentioned above; such as, by an Organizational Tree Constructor 113 that performs this automatically based on pre-defined rules and/or lookup table(s).

In some embodiments, optionally, a Natural Language Processing (NLP) Unit 114, and/or a textual analysis unit, and/or a contextual analysis unit, and/or a Large Language Model (LLM) 115A, may be utilized in order to deduce or determine connections and/or relations among users; for example, by determining a connection or a relation between "Adam Smith, manager of the Smith Group" and "Jane Brown, member in the Smith Group" and "David Lewis, assistant in the Smith Group", and/or by determining that Adam has a supervisory role and David has a subordinate role, or the like. In some embodiments, optionally, a pre-defined lookup table may be utilized to indicate typical relations among users or among particular roles; for example, indicating that typically, a user whose organizational role is "Accounts Receivable assistant" is a subordinate (directly or indirectly) of a person whose organizational role is "CFO"; or that indicate that a person whose email signature is "X, administrative assistant to Y" is a direct subordinate of Y; or the like.

The step of collecting data may further include, for example: (i) collection and analysis of domain information or domain-related information, via a Domain Information Collector 116; (ii) analysis of calendar data (e.g., events data, meetings data, scheduled items data, past calendar events data, future calendar events data, recurring calendar events data) of users in the organization, or from user accounts or from user devices, such as by a Calendars Data Collector & Analyzer 117; (iii) analysis of events log and operations logs (e.g., via an Events & Operations Analyzer 118) that are kept for all the operations performed in the organizational system/network/servers/repositories, such as, determining that User A typically accesses Repository B on a daily basis, and never accesses Repository C; or, determining that User A typically sends emails to User B, on a weekly basis, but never to User D; or, determining that User A and User E have been in the same organizational meeting at least one time in the past 12 months, whereas User A and User F have not; or the like).

The step of collecting data may further include, for example, determining or establishing or deducing Peer Groups for users in the organization, and/or determining membership or association of particular user(s) with particular Peer Group(s); for example, by a Peer Groups Analyzer 119 that is configured for determining that users A and B and C belong to a first Peer Group, and that users C and D and E and F belong to a second, different, Peer Group. Some embodiments may detect or determine or define Peer Groups in the organization, and/or may associate a particular user or user-account with one or more particular Peer Groups in the organization, by utilizing one or more components, operations and/or methods that are described in U.S. Pat. No. 7,606,801 and/or U.S. Pat. No. 7,555,482 and/or U.S. Pat. No. 8,438,611 and/or U.S. Pat. No. 9,641, 334 and/or U.S. Pat. No. 9,870,480, all of which are hereby incorporated by reference in their entirety.

In accordance with some embodiments, in response to a new/incoming/received/generated security alert message or signal, the following process is performed. Step (A): automatically creating via an LLM an alert-specific investigation playbook. Step (B): automatically estimating or determining via the LLM a True Positive Confidence and Risk Score (TPCRS) value for the alert. Step (C): automatically performing one or more iterations of an automated LLM-based alert investigation loop. Step (D): automatically triggering or deploying one or more mitigation operations or remedial actions, if one or more pre-defined conditions hold true and/or if an estimated risk score is greater than a pre-defined threshold value.

In Step (A), an Alert-Specific Investigation Playbook is created or generated by an Alert-Specific Investigation Playbook Generator 121. For example, given the alert data and meta-data, as well as the relevant Organizational Context, such as events, key risk indicators, statements from supporting data sources (external sources, organizational sources), the Alert-Specific Investigation Playbook Generator 121 utilizes the LLM 115 to generate an Alert-Specific Investigation Playbook.

In Step (B), for automatically estimating or determining via the LLM a True Positive Confidence Score (TPCRS) value for the alert, a TPCRS Generator 122 asks the LLM 115 to calculate a numeric score within a pre-defined range (e.g., between 0 to 100) indicating the confidence of the LLM 115 that this security alert pertains to a True Positive alert (namely, it reflects an actual security threat; and it is not a "False Positive"). In some embodiments, optionally, the LLM 115 may be commanded to create a vector of Key Risk Indicators (KRIs), and to assign a numeric value to each element in that vector.

In Step (C), an Investigation Loop Controller 123 operates to automatically perform one or more iterations of an automated LLM-based alert investigation loop. After each iteration of the LLM-based alert investigation loop, the Investigation Loop Controller 123 checks whether or not the TPRCS value exceeds a pre-defined threshold value, which can be referred to as a pre-defined validity threshold value.

If the TPCRS value exceeds a pre-defined validity threshold value, then the Investigation Loop Controller 123 operates to end the alert investigation loop (e.g., no further iterations are performed), and the Investigation Loop Controller 123 generates a notification or a report that this particular security alert has been determined to be valid or has been determined to be a True Positive. Optionally, such notification may be sent or transmitted or conveyed to one or more end-users (e.g., network administrator) and/or to one or more end-user devices and organizational devices;

and may automatically trigger or invoke or deploy or activate one or more threat mitigation/prevention/remediation actions by one or more Mitigation/Prevention/Damage Reduction Units 124, such as: quarantining of an email message; disconnecting a device from a network; forcing a password reset for a particular account; forcing a remote log-off or log-out for a particular account; triggering a request to perform a secondary or additional authentication or log-in; blocking access of User U to Resource R; blocking access of Device D to Resource R; or the like.

Conversely, if the TPCRS value does not exceed the pre-defined validity threshold value, then the Investigation Loop Controller 123 operates to obtain additional data from the Organizational Context Database 102 and to re-calculate the TPCRS value after another iteration. In each iteration of the LLM-based investigation loop, the LLM 115 is asked, using prompts (that can be augmented an enriched via Retrieval-Augmented Generation (RAG) based on a questions-and-answers database of accumulated information from previous automated investigations of other alerts), to generate follow-up questions and/or to generate requests for additional context information originating from the same and/or from additional data sources (internal to the organization and/or external to the organization). The LLM 115 is further utilized to construct the queries and the technical commands for obtaining the additional context from connected data-sources via a Fetching Agent Unit 127 that obtains the requested data. In some embodiments, if the LLM responds that it cannot construct such additional queries, the system may automatically request particular feedback from a human user. Data obtained from the additional questions or queries via the Fetching Agent Unit 127 (and/or from feedback that human user(s) have provided in response to specific questions) is added to the organizational context for investigating the alert, and the LLM 115 is commanded to re-calculate or to update the TPCRS value for this alert based on the current context and supporting information, optionally taking into account a particular validity score or certainty score for each additional information item that was added. In some embodiments, such additional questions or queries or requests may be generated by LLM 115 which may be configured or controlled by a Follow-Up Questions Generator 129, which may be responsible for prompting the LLM 115 to generate such additional questions or queries.

In Step (D), a Remediation Unit 125 automatically triggers or deploys one or more mitigation operations or remedial actions, if one or more pre-defined conditions hold true and/or if the most-updated TPCRS value is greater than a pre-defined threshold value.

In accordance with some embodiments, the currently-updated or the most-recently-updated TPCRS value for this alert for the alert being investigated, is compared to two threshold values: if the TPCRS value is smaller than a False Positive threshold value, then a False Positive alert message is declared and can be discarded. If the TPCRS value is greater than a True Positive threshold value, then a True Positive alert message is declared, and one or more pre-defined and relevant mitigation operations are automatically activated or deployed. If the current TPCRS value is between those two threshold values (or is equal to one of them), then the evaluation result is currently "inconclusive", and another iteration is performed with at least one more alert-tailored question that is addressed to the organizational context database (via the Fetching Agent Unit 127) and/or to a human user via his end-user device; until the iterative process converges into a False Positive risk value or into a True Positive risk value. In some embodiments, a Convergence Controller 128 is responsible to ensure that the LLM 115 continues to generate follow-up questions or inquiries, or request to fetch additional context information, until such convergence is achieved.

In some embodiments, a Questions-and-Answers Database 130 is constructed and is dynamically updated to store therein such follow-up questions, and the answers or responses that human users provided to them, as well as the automatically collected information items that the Fetching Agent Unit 127 has obtained from the organizational database and/or from other available data sources. In accordance with some embodiments, LLM 115 may utilize the content of such Questions-and-Answers Database 130 as additional context for investigating or evaluating a subsequent alert message. For example, a first alert message on Monday may indicate that User Janet has remotely logged-in to her organizational email account after 90 days of inactivity; the LLM 115 may obtain additional informational context, from organizational resources (via the Fetching Agent Unit 127) or from a human user, indicating that User Janet has just returned from a 90-day maternity leave; and this alert message is thus marked as a False Positive in view of an updated, reduced TPCRS value. The additional informational context of User Janet returning now from her maternity leave, is added to the Questions-and-Answers Database 130. Two days later, User Janet logs-in to the organization's billing system, again triggering a security alert message regarding a remote log-in after a long period of not logging into the billing system. This time, LLM 115 firstly checks the Questions-and-Answers Database 130; utilizes the added information about the recent return from maternity leave; and can resolve this new alert message as a False Positive, this time without the need to ask a human user to clarify the facts that pertain to this incident. Additionally or alternatively, in some embodiments, a Retrieval-Augmented Generation (RAG) Unit 131 may operate as a Prompt Augmenter & Enricher 132, to dynamically augment and enrich the prompts provide to the LLM 115 based on the information that was accumulated and stored in the Questions-and-Answers Database 130 in previous alert investigations.

In accordance with some embodiments, the Questions-and-Answers Database 130 may provide various advantages. Firstly, it may enable the system to know and to learn, from past investigations of past alerts, relevant answers to questions that the system needs for investigating a current alert; optionally (in some situations) even entirely obviating the need to involve a human in the current alert investigation and/or entirely obviating the need to collect a manual feedback or an answer from a human in the current alert investigation. Secondly, the Questions-and-Answers Database 130 may enable the system to ask or to use a smaller number of questions, such as only 3 questions instead of 10 questions, for investigating a current alert, since the information in the Questions-and-Answers Database 130 can provide missing information-items or context for converging into a decision or into a final risk score. Thirdly, the Questions-and-Answers Database 130 may contain information that can take the system towards a particular direction for asking one or more questions, or that may take the system away from another direction for asking one or more questions, based on past investigations of past alerts; for example, the Questions-and-Answers Database 130 may show that in past investigations, a fresh log-in attempt by an employee who did not log in for several months, has been rapidly resolved by checking whether the employee has recently come back from a maternity leave or from a leave-of-absence, and the system may thus ask question/s to probe the data in this direction; and in contrast, the Questions-and-Answers Database 130 may also show that in similar alert investigations in the past, a probing into "which version of the Web Browser is utilized" did not advance past investigations, and can be avoided or postponed in this current investigation of the current alert. The Questions-and-Answers Database 130 may provide other advantages.

In accordance with some embodiments, an LLM Fine-Tuner 126 operates to continuously and/or periodically fine-tune the LLM 115. For example, a proprietary or an open-source LLM (e.g., Llama2, Mistral, Claude, or the like) can be fine-tuned based on the relevant domain knowledge. In the fine-tuning process, the LLM's weights, which had been pre-trained on a vast corpus of general data, are further adjusted or modified to perform well on a specific task or domain. This is done by continuing the training process with a smaller, targeted, dataset that is representative of the task or domain of interest (e.g., security threats; security alerts; security incident reports; investigation of security alerts; threats data; attacks data).

The Applicant have realized that the fine-tuning of the LLM for the particular purpose of excelling in investigation of security alerts may be beneficial for several reasons. (a) Specialization: While pre-trained LLMs have a broad understanding of language, they may not be optimized for specific jargon or slang or buzz-words, writing styles, or nuanced expression used in particular domains, such as in the threat intelligence domain and "threat hunting"/threat investigation domain. (b) Improved Performance: Fine-tuning enables the LLM to adapt its parameters to the specifics of a dataset, which can lead to better performance metrics (e.g., accuracy, F1 score) on the desired task. (c) Task-Specific Knowledge: Tasks like question-answering, summarization, or sentiment analysis may require the LLM to learn patterns that were not the focus of its initial general pre-training. (d) Data Efficiency: Fine-tuning can achieve good results with relatively small amounts of task-specific data, leveraging the knowledge already encoded in the LLM during its general pre-training. (e) Addressing Data Bias: Pre-trained LLMs may inherit biases from their general training data; fine-tuning the LLM on a more balanced or curated dataset can mitigate such biases.

In accordance with some embodiments, the fine-tuning of the LLM may include one or more of the following operations. (a) Initialization: The model starts with weights that have been learned during its general pre-training phase. (b) Further Training: The model is fine-tuned using a task-specific dataset, which is much smaller than the general dataset used for pre-training, and which contains particular examples of the task that the model would need to perform (e.g., investigation of security alert; evaluation of security threats). (c) Parameter Adjustment: During the fine-tuning, the model's parameters (weights and biases) are updated to minimize the loss function specific to the task; for example, using gradient descent and backpropagation. (d) Learning Rate: Often, a lower learning rate is used compared to the initial general pre-training phase, to make smaller adjustments to the weights and/or to avoid overwriting of the pre-existing knowledge that is encoded in the model; the lower learning rate ensuring that the LLM does not "forget" or overwrites the initial information on which it was pre-trained, but rather learns or adds new capabilities. (e) Regularization: Techniques such as early stopping or drop-out may be used to prevent overfitting to the fine-tuning dataset, ensuring that the model retains its generalizability. (f) Freezing Layers: Sometimes, only a portion of the model's layers are fine-tuned while others are "frozen"; in some situations, the last few layers are fine-tuned because they are more task-specific, while earlier layers capture general language features. (g) Balancing: the fine-tuning process is balancing between retaining the vast knowledge that the model had gained during its general pre-training, and adapting it sufficiently in order to excel at a specific task or a particular type of tasks in a particular domain. The LLM is fine-tuned to understand and generate text in a way that is tailored to the requirements of the particular application or task, which is: (I) the ability to analyze threat intelligence providers documentation and customer textual rules and create a list of Application Programming Interface (API) calls and queries to obtain the needed data, and (II) the ability to "read" or process a large amount of threat intelligence data and to automatically generate an insightful and actionable alert message and/or incident report with regard to a particular security alert.

In a first demonstrative and non-limiting example, a security alert was received or was generated indicating an unusual/suspicious/abnormal login attempt from a new electronic device and from a new location at local time 3:45 a.m. for the user Adam Smith. The system automatically determines three relevant Key Risk Indicators (KRIs): log-in attempt from a new device, KRI of 0.2; log-in attempt from a new location, KRI of 0.3; log-in attempt outside business hours and particularly late at night when most users are sleeping, KRI of 0.1; the initial Risk Score is calculated as the sum of these KRI values, which is 0.6. In a demonstrative example, the threshold value to determine that this alert is a "true positive" and/or is a "high risk" alert is set at 0.8, and therefore, initially this alert is not yet a "high risk" alert.

In this first demonstrative example, the LLM generates the following alert-specific investigation playbook: (a) check whether the user is traveling, and/or has reported that he is utilizing a new device; (b) check whether there are multiple failed login attempts by that user/from that device, in the past H hours; (c) review recent activities and behavior of this user and check if abnormal/unusual activity is detected (e.g., at least N files or M megabytes of data were copied or were deleted by the user).

In this first demonstrative example, as part of Iteration 1 of the alert investigation loop, the system checks the user's events and finds that there is no travel scheduled or reported (based on exchange events). The risk score is updated with a new KRI of "No Travel Scheduled", with a value of 0.1. Accordingly, the updated cumulative risk score has now increased from 0.6 to 0.7; but it is still below the threshold value of 0.8.

In this first demonstrative example, as part of Iteration 2 of the alert investigation loop, the system checks for failed login attempts and finds that there were multiple failed log-in attempts in the past H hours and/or before the successful login. The risk score is updated with a new KRI of "Multiple Failed Log-in Attempts", with a value of 0.15; and the updated cumulative risk score has now increased from 0.7 to 0.85, which exceeds the threshold value of 0.8. Therefore, the system proceeds to raise or escalate or notify the alert to one or more recipients, and/or to trigger mitigation operations; and stops execution of the alert investigation loop. The response operations/mitigation operations to this high-risk alert are initiated according to pre-defined rules or policy, which may include notifying one or more particular users, temporarily locking or blocking the user's account until the user's identity is verified by a human investigator, forcing a log-out and/or forcing an additional authentication of the user using a different authentication factor, or the like.

In a second demonstrative and non-limiting example, an alert is received that user Janet Brown has logged in after a long period of inactivity. The system generates the following Key Risk Indicators (KRIs): Long Period of Inactivity, KRI of 0.6; Time of Login (during business hours), KRI of 0.1. The initial risk score is calculated as the sum of these KRI values, which is 0.7. The threshold for a high-risk alert is set (in this example) at 0.8; and another threshold may be used to indicate a no-risk alert or a low-risk alert or a "can be safely discarded" alert, such as 0.15, so that a calculated risk score that is below that low-risk alert threshold then this alert can be discarded or may be marked as an alert that does not require further handling.

In this second demonstrative example, the LLM generates the following alert-specific investigation playbook: (a) Check if there are any recent changes in the user's role or responsibilities; (b) Review Peers activity for relevant or helpful or abnormal indicators; (c) Review the operations that were performed by this user after this login.

In this second demonstrative example, as part of Iteration 1 of the alert investigation loop, the system checks the user's recent activities and finds that the user did not perform any access to sensitive data following this login. The risk score is updated with this new KRI: "No access to sensitive data", value −0.2. The cumulative risk score is decreased from 0.7 to 0.5.

In this second demonstrative example, as part of Iteration 2 of the alert investigation loop, the system checks but cannot find any recent changes in the user's role or responsibilities that would explain the long period of inactivity. At this point, the system actively asks a relevant user (e.g., supervisor of Janet Brown) for human input. The queried user provides an answer that Janet Brown was on maternity leave for three months. The risk score is updated with this new KRI: "User Input—Possible Maternity Leave" with a value of −0.4. The cumulative risk score is thus reduced from 0.5 to 0.1. Since the risk score is low, and since the risk score is below the threshold value for a high-risk alert (which was set at 0.8 in this example), and more importantly since the risk score is below the threshold value for low-risk alert (which was set at 0.15 in this example), the system does not proceed to raise or notify the alert (or, the system otherwise marks this alert as an alert that can be safely discarded, or as an alert that does not require any further actions or monitoring), and the system does not activate mitigation operations; no additional context information is needed in this case, and the alert investigation loop stops. This alert is classified as an alert that does not need further actions or further notifications, or as an alert that has been investigated and resolved.

In accordance with various embodiments, optionally, a single threshold value may be used, or two threshold values may be used, or another number of threshold values may be used, to enable the system to automatically reach a fine-grained decision with regard to a calculated risk score of an alert, or to enable the system to selectively trigger or propose one or more mitigation operations. In a first demonstrative implementation, optionally, a single threshold value may be used; such that, if the risk score that is calculated for a particular alert is greater than or equal to that single threshold value, then the alert message is routed to a human evaluator or to a reviewing user for further evaluation, and/or one or more operations are automatically triggered or activated; whereas, if the risk score that is calculated for that particular alert is smaller than that single threshold value, then the alert message is discarded or is marked as an alert that does not require further handling or monitoring. In a second demonstrative implementation, optionally, two threshold values may be used; for example, a low-risk threshold value V1, and a high-risk threshold value V2; such that, if the risk score that is calculated for a particular alert is greater than the high-risk threshold value V2, then the alert message is routed to a human evaluator or to a reviewing user for further evaluation, and/or one or more operations are automatically triggered or activated; whereas, if the risk score that is calculated for that particular alert is smaller than the low-risk threshold value V1, then the alert message is discarded or is marked as an alert that does not require further handling or monitoring; and whereas, if the if the risk score that is calculated for that particular alert is in the range of V1 to V2, then the system continues to iteratively investigate the security alert message until a newly-calculated risk score is greater than V2 or is smaller than V1. In a third demonstrative implementation, optionally, three or more threshold values may be used; for example, an alert that receives a risk score greater than V2 (e.g., greater than 0.7) is triggers to a first path of mitigation operations and/or is routed to a first level of engineer; whereas an alert that receives a risk score that is also greater than V3 (e.g., V3 is 0.9, or V3 is otherwise greater than V2), the alert is also routed to the attention of the CTO of the organization and/or the alert triggers a second path of mitigation operations. Other types or numbers of threshold values may be used in various embodiments, to cause a more fine-grained automatic handling of various alerts based on the risk score calculated for them.

Figure 2:
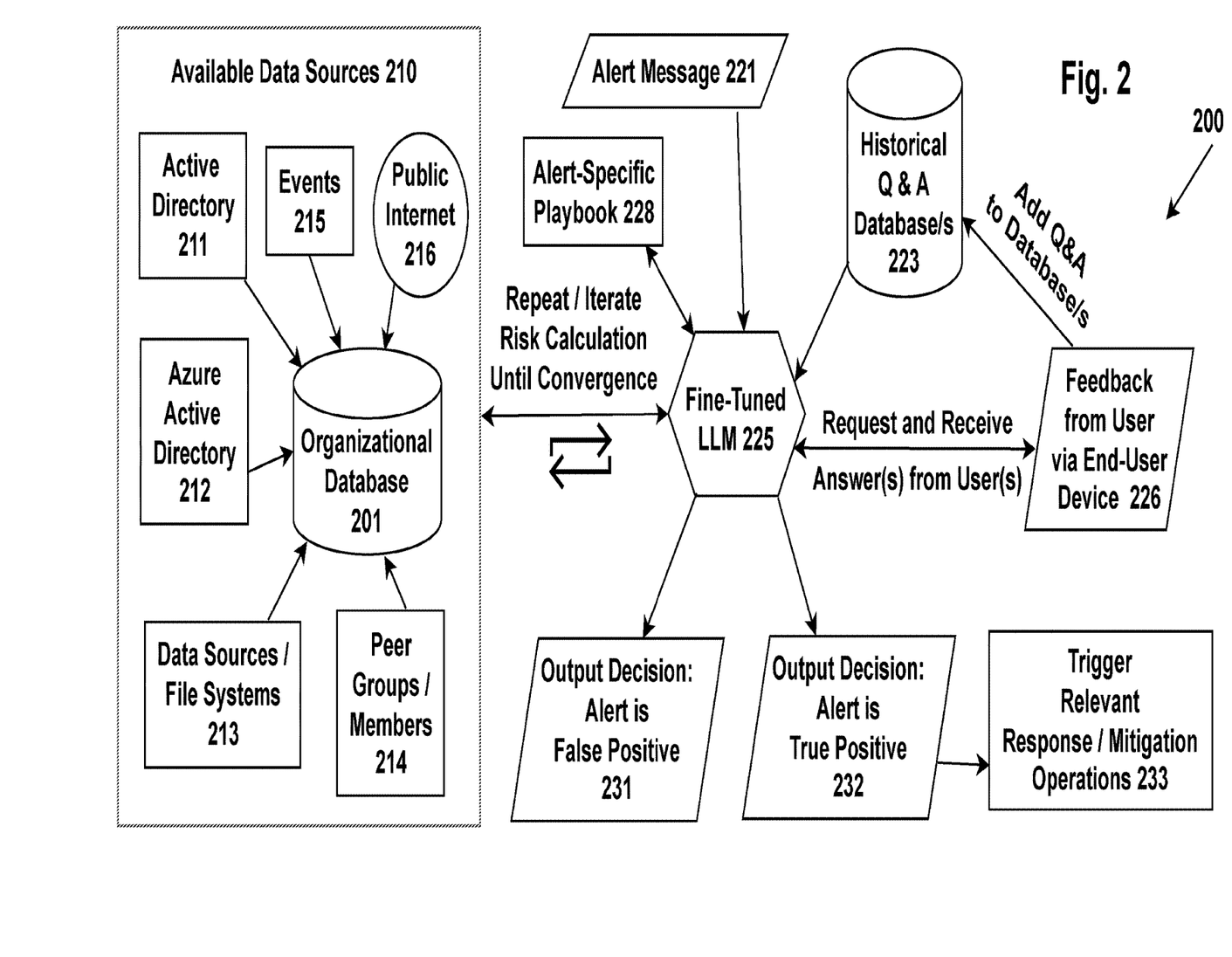
FIG. 2 is a schematic illustration of a system, in accordance with some demonstrative embodiments.

Reference is made to FIG. 2, which is a schematic illustration of a system 200, in accordance with some demonstrative embodiments. System 200 of FIG. 2 may be a demonstrative implementation of System 100 of FIG. 1.

For example, an Organizational Database 201 may be constructed and updated based on data extracted and/or converted from a plurality of Available Data Sources 210; such as: Active Directory (AD) 211, Azure Active Directory (AAD) 212, Data Sources/File Systems 213, data about Peer Groups and their Members 214, Events data 215 or events log, and data from the public Internet 216. An alert message 221 is received by the system or is generated by another component of the system or by an external component; an alert-specific playbook 228 is generated automatically, and a Fine-Tuned LLM 225 performs a repetitive yet converging process of multiple-iterations or multiple-phases, in which the LLM 225 is prompted to re-calculate a Risk Score of confidence score or other indicator value with regard to the level of risk or exposure that is currently associated with the alert under investigation. Additional queries or questions are iteratively generated by the LLM 225, and additional information is obtained from the Organizational Database 201 (and/or, in some embodiments, from one or more of the Available Data Sources 210, directly and/or indirectly via the Organizational Database 201). Optionally, and particularly if the data obtained from the Organizational Database 201 is not sufficient to reach convergence into either a "false positive" or a "true positive" decision, the LLM 225 may request and receive answer(s) to particular question(s) that the LLM 225 poses to one or more particular user(s) in the organization. Such answers or feedback 226 are sent back to the LLM 225 for further processing or as additional informational context; and are also stored in one or more Historical Questions-and-Answers Database(s) 223, which can also be used as an information source or as a context source for the LLM 225. If the LLM 225 determines that it has sufficient certainty (e.g., beyond a pre-defined threshold level of confidence) that the alert message 221 is a False Positive, then a suitable False Positive output 231 is generated and outputted or notified. Conversely, if the LLM 225 determines that it has sufficient certainty (e.g., beyond a pre-defined threshold level of confidence) that the alert message 221 is a True Positive, then a suitable True Positive output 232 is generated and outputted or notified; and one or more suitable or relevant response operations or mitigation operations 233 are triggered or initiated.

Figure 3:
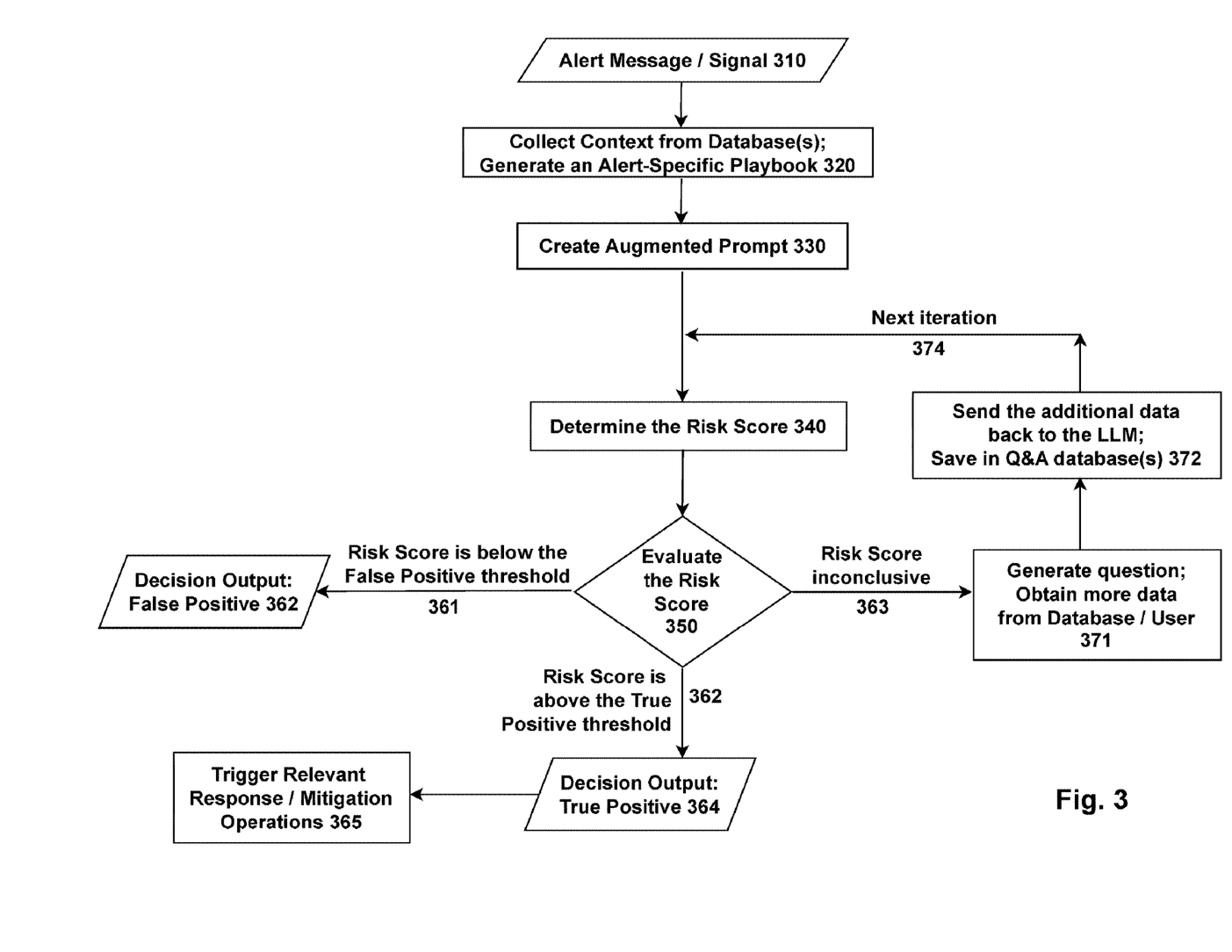
FIG. 3 is a flow-chart of operations in accordance with some demonstrative embodiments.

Reference is made to FIG. 3, which is a flow-chart of operations in accordance with some demonstrative embodiments. The operations of FIG. 3 may be performed by System 100 of FIG. 1, or by System 200 of FIG. 2, or by other suitable systems.

As indicated in block 310, an alert message or alert signal is received, or is generated by the system or by an external component or external source.

As indicated in block 320, an agent unit or agent module collects relevant data from the available data sources and/or organizational database, based on the context of the specific alert message. Additionally, as indicated in block 320, an alert-specific playbook is generated for the particular alert that is being investigated.

As indicated in block 33, an augmented prompt is generated, containing or indicating: (I) the content or data of the alert message, and (II) the meta-data of the alert message (e.g., which user or account received it; at what time; on what date), and (III) the additional context data collected in block 320.

As indicated in block 340, a fine-tuned LLM calculates or estimates or determines the current Risk Score for this alert message, based on the augmented prompt.

As indicated in block 350, the Risk Score is evaluated (e.g., by the LLM, or by another unit or comparator module), in order to take the suitable route of operations.

As indicated by arrow 361, if the Risk Score is below the False Positive threshold value, then the decision output is that this alert message is a False Positive (block 362), and this alert message can be "closed" or can be marked as "resolved" or "discarded" or "was a False Positive and does not require further actions".

Alternatively, as indicated by arrow 362, if the Risk Score is above the True Positive threshold value, that the decision output is that this alert message is a True Positive (block 364); and optionally, one or more relevant response/mitigation operations are triggered or activated (block 365).

Alternatively, as indicate by arrow 363, if the Risk Score is not below the False Positive threshold value and is also not above the True Positive threshold value, such that the Risk Score is inconclusive, then an additional iteration of investigation is automatically performed: a question is generated in order to probe the available database(s) and/or one or more particular user(s) for additional information, such as by requesting a specific answer to a newly-generated specific question that can provide additional context information regarding this alert message and/or regarding relevant facts (e.g., question about a user or a user-account or an asset that is mentioned in the alert message or that is the subject of the alert message). The newly-generated question yields additional data (block 371) from the available database(s) and/or from the particular user(s) that were queried; and the additional data is sent back to the LLM, and is also saved in the questions-and-answers database(s) (block 372), and a new iteration is performed (arrow 374) in which an updated Risk Score is determined and then evaluated, and so forth. The storage of a question and its answer in a database, which is then available for future iterations, can prevent unnecessary queries to human user(s) in order to collect data that was already provided by at least one human response.

Some embodiments provide a non-transitory storage medium having stored thereon instructions that, when executed by a machine, cause the machine to perform a method as described above and/or herein.

Some embodiments provide a system comprising: one or more hardware processors, configured to execute code; associated with one or more memory units, configured to store data; wherein the one or more hardware processors are configured to perform an automated process or an automated method as described above and/or herein.

Some embodiments provide a computerized method comprising: (a) receiving a Security Alert Message pertaining to a possible security-related incident pertaining to an organization; and (b) automatically evaluating whether the Security Alert Message is either (I) a False Positive security alert message or (II) a True Positive security alert message, by performing an iterative multi-phase converging process in which a Large Language Model (LLM) evaluates at least: (i) content of said Security Alert Message, and (ii) meta-data of said Security Alert Message, and (iii) organizational context that is related to said Security Alert Message.

In some embodiments, as part of said iterative multi-phase converging process, said LLM iteratively determines and updates a Risk Score for said Security Alert Message by taking into account: (i) an alert-specific playbook that is generated automatically for said Security Alert Message, and (ii) the content of said Security Alert Message, and (iii) the meta-data of said Security Alert Message, and (iv) the organizational context that is related to said Security Alert Message.

In some embodiments, the method comprises: if a most-updated value of the Risk Score of said Security Alert Message is smaller than a pre-defined False Positive threshold value, then: marking said Security Alert Message as a False Positive alert message.

In some embodiments, the method comprises: if the most-updated value of the Risk Score of said Security Alert Message is greater than a pre-defined True Positive threshold value, then: marking said Security Alert Message as a True Positive alert message, and activating one or more pre-defined threat mitigation operations that are determined to be relevant to said Security Alert Message.

In some embodiments, the method comprises: if the most-updated value of the Risk Score of said Security Alert Message is not greater than said pre-defined True Positive threshold value, and is also not smaller than said pre-defined False Positive threshold value, then: automatically obtaining additional context information that is relevant to said Security Alert Message; automatically providing the additional context information to said LLM; prompting the LLM to update the Risk Score based on said additional context information; iteratively re-evaluating the Risk Score as (i) indicating a False Positive alert message, or as (ii) indicating a True Positive alert message, or (iii) being inconclusive and requiring at least one additional iteration of obtaining additional context data.

In some embodiments, obtaining the additional context information comprises: prompting the LLM to generate a follow-up question that the LLM estimates to trigger a response that can provide new useful context for re-evaluating said Security Alert Message; based on said follow-up questions, instructing an automated Agent Unit to fetch a particular information item from an Organizational Context Database as a response to said follow-up question.

In some embodiments, the method comprises: storing in a questions-and-answers database the follow-up question and the information item that the automated Agent Unit fetched from the Organizational Context Database, and re-using said particular information item for evaluating a subsequent, different, security alert message; and performing Retrieval-Augmented Generation (RAG) of prompts, that are fed into said LLM, based on content that was accumulated in said questions-and-answers database in previous automated investigations of previous alert messages.

In some embodiments, obtaining the additional context information comprises: generating a follow-up question that is addressed to a particular user in the organization; sending said follow-up question to said particular user; receiving an answer from said particular user to said follow-up question; utilizing said answer as additional context by said LLM for updating the Risk Score for said Security Alert Message.

In some embodiments, the method comprises: storing in a questions-and-answers database the follow-up question item and said answer, and re-using said follow-up question and said answer for evaluating a subsequent, different, security alert message.

In some embodiments, the method comprises: prior to generating the follow-up question to said particular user, estimating by the LLM whether or not any additional context data, that would be relevant for evaluating said Security Alert Message, can be obtained from non-human information sources that are available to the organization; if, and only if, the LLM estimates that no additional context data, that would be relevant for evaluating said Security Alert Message, can be obtained from non-human information sources that are available to the organization, then generating the follow-up question to said particular user.

In some embodiments, the method comprises: prior to generating the follow-up question to said particular user, checking by the LLM whether or not any follow-up questions, that were already posed to one or more users in said organization with regard to other security alert messages, and their respective answers as stored in a questions-and-answers database, are useful for updating the Risk Score for said Security Alert Message; if, and only if, the checking result is negative, then: generating the follow-up question to said particular user.

In some embodiments, the method comprises: prompting said LLM to update the Risk Score for said Security Alert Message, based on organizational context information that includes at least: (i) user data and account data from an Active Directory; (ii) data from organizational file systems and organizational data repositories; (iii) data from event logs of said organization.

In some embodiments, the organizational context information further comprises: organizational context that was automatically calculated and derived from organizational data, and that describes Peer Groups among users of said organizations, generated using a peer group detection process that checks which users regularly interact with which other users in said organization.

In some embodiments, the organizational context information further comprises: organizational context that describes at least: (i) users in said organization, and access privileges of each user to each resource of the organization; (ii) devices in said organization, and access privileges of each device to each resource of the organization.

In some embodiments, the method comprises: the organizational context information further comprises: additional organizational context that is extracted from one or more of: a Customer Relationship Management (CRM) system of said organization, a Supply Chain Management (SCM) system of said organization, an Enterprise Resource Planning (ERP) system of said organization, an Active Directory (AD or AAD) of said organization.

In some embodiments, the method comprises: fine-tuning said LLM, by modifying weights of parameters that said LLM uses, based on a specific dataset of correctly-evaluated security alert messages and their content and their meta-data.

In some embodiments, the method comprises: fine-tuning the LLM to generate relevant and accurate outputs in response to engineered prompts that command said LLM to perform a specific task of generating a Risk Score for an incoming Security Alert Message in a specific field of Security Domain.

In some embodiments, the method comprises: iteratively re-calculating and re-evaluating the Risk Score for said Security Alert Message, until the LLM converges to a decision that the Security Alert Message is either (i) a False Positive alert message or (ii) a True Positive alert message, in view of a False Positive threshold value and a True Positive threshold value.

Some embodiments provide automated multi-phase investigation of security incident alerts using a Large Language Model (LLM) with converging dialogue. For example, a computerized system receives a Security Alert Message pertaining to a possible security-related incident pertaining to an organization. The system automatically evaluates whether the Security Alert Message is either (I) a False Positive security alert message or (II) a True Positive security alert message, by performing an iterative multi-phase converging process in which the LLM evaluates at least: (i) the content of that Security Alert Message, and (ii) the meta-data of that Security Alert Message, and (iii) organizational context that is related to that Security Alert Message. An iterative process is performed by the LLM, which utilizes an Agent Module to fetch additional context information from organizational sources. The LLM re-updates the Risk Score and re-evaluates the Risk Score until convergence to a decision.

Although portions of the discussion herein relate, for demonstrative purposes, to wired links and/or wired communications, some embodiments of the present invention are not limited in this regard, and may include one or more wired or wireless links, may utilize one or more components of wireless communication, may utilize one or more methods or protocols of wireless communication, or the like. Some embodiments may utilize wired communication and/or wireless communication.

Some embodiments may be implemented by using hardware units, software units, processors, CPUs, DSPs, GPUs, integrated circuits (ICs), memory units, storage units, wireless communication modems or transmitters or receivers or transceivers, cellular transceivers, a power source, input units, output units, Operating System (OS), drivers, applications, and/or other suitable components.

Some embodiments may be implemented by using a special-purpose machine or a specific-purpose that is not a generic computer, or by using a non-generic computer or a non-general computer or machine. Such system or device may utilize or may comprise one or more units or modules that are not part of a "generic computer" and that are not part of a "general purpose computer", for example, cellular transceivers, cellular transmitter, cellular receiver, GPS unit, location-determining unit, accelerometer(s), gyroscope(s), device-orientation detectors or sensors, device-positioning detectors or sensors, or the like.

Some embodiments may be implemented by using code or program code or machine-readable instructions or machine-readable code, which is stored on a non-transitory storage medium or non-transitory storage article (e.g., a CD-ROM, a DVD-ROM, a physical memory unit, a physical storage unit), such that the program or code or instructions, when executed by a processor or a machine or a computer, cause such device to perform a method in accordance with the present invention.

Some embodiments may be utilized with a variety of devices or systems having a touch-screen or a touch-sensitive surface; for example, a smartphone, a cellular phone, a mobile phone, a smart-watch, a tablet, a handheld device, a portable electronic device, a portable gaming device, a portable audio/video player, an Augmented Reality (AR) or Virtual Reality (VR) or Mixed Reality (XR) device or headset or gear, a "kiosk" type device, a vending machine, an Automatic Teller Machine (ATM), a laptop computer, a desktop computer, a vehicular computer, a vehicular dashboard, a vehicular touch-screen, or the like.

The system(s) and/or device(s) of some embodiments may optionally comprise, or may be implemented by utilizing suitable hardware components and/or software components; for example, processors, processor cores, Central Processing Units (CPUs), Digital Signal Processors (DSPs), circuits, Integrated Circuits (ICs), controllers, memory units, registers, accumulators, storage units, input units (e.g., touch-screen, keyboard, keypad, stylus, mouse, touchpad, joystick, trackball, microphones), output units (e.g., screen, touch-screen, monitor, display unit, audio speakers), acoustic microphone(s) and/or sensor(s), optical microphone(s) and/or sensor(s), laser or laser-based microphone(s) and/or sensor(s), wired or wireless modems or transceivers or transmitters or receivers, GPS receiver or GPS element or other location-based or location-determining unit or system, network elements (e.g., routers, switches, hubs, antennas), and/or other suitable components and/or modules.

The system(s) and/or devices of some embodiments may optionally be implemented by utilizing co-located components, remote components or modules, "cloud computing" servers or devices or storage, client/server architecture, peer-to-peer architecture, distributed architecture, and/or other suitable architectures or system topologies or network topologies.

In accordance with some embodiments, calculations, operations and/or determinations may be performed locally within a single device, or may be performed by or across multiple devices, or may be performed partially locally and partially remotely (e.g., at a remote server) by optionally utilizing a communication channel to exchange raw data and/or processed data and/or processing results.

Some embodiments may be implemented by using a special-purpose machine or a specific-purpose device that is not a generic computer, or by using a non-generic computer or a non-general computer or machine. Such system or device may utilize or may comprise one or more components or units or modules that are not part of a "generic computer" and that are not part of a "general purpose computer", for example, cellular transceivers, cellular transmitter, cellular receiver, GPS unit, location-determining unit, accelerometer(s), gyroscope(s), device-orientation detectors or sensors, device-positioning detectors or sensors, or the like.

Some embodiments may be implemented as, or by utilizing, an automated method or automated process, or a machine-implemented method or process, or as a semi-automated or partially-automated method or process, or as a set of steps or operations which may be executed or performed by a computer or machine or system or other device.

Some embodiments may be implemented by using code or program code or machine-readable instructions or machine-readable code, which may be stored on a non-transitory storage medium or non-transitory storage article (e.g., a CD-ROM, a DVD-ROM, a physical memory unit, a physical storage unit, a Flash drive), such that the program or code or instructions, when executed by a processor or a machine or a computer, cause such processor or machine or computer to perform a method or process as described herein. Such code or instructions may be or may comprise, for example, one or more of: software, a software module, an application, a program, a subroutine, instructions, an instruction set, computing code, words, values, symbols, strings, variables, source code, compiled code, interpreted code, executable code, static code, dynamic code; including (but not limited to) code or instructions in high-level programming language, low-level programming language, object-oriented programming language, visual programming language, compiled programming language, interpreted programming language, C, C++, C#, Java, JavaScript, SQL, Ruby on Rails, Go, Cobol, Fortran, ActionScript, AJAX, XML, JSON, Lisp, Eiffel, Verilog, Hardware Description Language (HDL), BASIC, Visual BASIC, MATLAB, Pascal, HTML, HTML5, CSS, Dart, Perl, Python, PHP, machine language, machine code, assembly language, or the like.

Discussions herein utilizing terms such as, for example, "processing", "computing", "calculating", "determining", "establishing", "analyzing", "checking", "detecting", "measuring", or the like, may refer to operation(s) and/or process(es) of a processor, a computer, a computing platform, a computing system, or other electronic device or computing device, that may automatically and/or autonomously manipulate and/or transform data represented as physical (e.g., electronic) quantities within registers and/or accumulators and/or memory units and/or storage units into other data or that may perform other suitable operations.

Some embodiments of the present invention may perform steps or operations such as, for example, "determining", "identifying", "comparing", "checking", "querying", "searching", "matching", and/or "analyzing", by utilizing, for example: a pre-defined threshold value to which one or more parameter values may be compared; a comparison between (i) sensed or measured or calculated value(s), and (ii) pre-defined or dynamically-generated threshold value(s) and/or range values and/or upper limit value and/or lower limit value and/or maximum value and/or minimum value; a comparison or matching between sensed or measured or calculated data, and one or more values as stored in a look-up table or a legend table or a list of reference value(s) or a database of reference values or ranges; a comparison or matching or searching process which searches for matches and/or identical results and/or similar results and/or sufficiently-close results (e.g., within a pre-defined threshold level of similarity; such as, within 5 percent above or below a pre-defined threshold value), among multiple values or limits that are stored in a database or look-up table; utilization of one or more equations, formula, weighted formula, and/or other calculation in order to determine similarity or a match between or among parameters or values; utilization of comparator units, lookup tables, threshold values, conditions, conditioning logic, Boolean operator(s) and/or other suitable components and/or operations.

The terms "plurality" and "a plurality", as used herein, include, for example, "multiple" or "two or more". For example, "a plurality of items" includes two or more items.

References to "one embodiment", "an embodiment", "demonstrative embodiment", "various embodiments", "some embodiments", and/or similar terms, may indicate that the embodiment(s) so described may optionally include a particular feature, structure, or characteristic, but not every embodiment necessarily includes the particular feature, structure, or characteristic. Repeated use of the phrase "in one embodiment" does not necessarily refer to the same embodiment, although it may. Repeated use of the phrase "in some embodiments" does not necessarily refer to the same set or group of embodiments, although it may.

As used herein, and unless otherwise specified, the utilization of ordinal adjectives such as "first", "second", "third", "fourth", and so forth, to describe an item or an object, merely indicates that different instances of such like items or objects are being referred to; and does not intend to imply as if the items or objects so described must be in a particular given sequence, either temporally, spatially, in ranking, or in any other ordering manner.

Some embodiments may comprise, or may be implemented by using, an "app" or application which may be downloaded or obtained from an "app store" or "applications store", for free or for a fee, or which may be pre-installed on a computing device or electronic device, or which may be transported to and/or installed on such computing device or electronic device.

Functions, operations, components and/or features described herein with reference to one or more embodiments of the present invention, may be combined with, or may be utilized in combination with, one or more other functions, operations, components and/or features described herein with reference to one or more other embodiments of the present invention. The present invention may comprise any possible combinations, re-arrangements, assembly, re-assembly, or other utilization of some or all of the modules or functions or components that are described herein, even if they are discussed in different locations or different chapters of the above discussion, or even if they are shown across different drawings or multiple drawings.

While certain features of some embodiments have been illustrated and described herein, many modifications, substitutions, changes, and equivalents may occur to those skilled in the art. Accordingly, the claims are intended to cover all such modifications, substitutions, changes, and equivalents.

What is claimed is:

1. A computerized method comprising:
   (a) receiving a Security Alert Message pertaining to a possible security-related incident pertaining to an organization;
   (b) automatically evaluating whether the Security Alert Message is either (I) a False Positive security alert message or (II) a True Positive security alert message, by performing an iterative multi-phase converging process in which a Large Language Model (LLM) evaluates at least: (i) content of said Security Alert Message, and (ii) meta-data of said Security Alert Message, and (iii) organizational context that is related to said Security Alert Message;
   (c) wherein as part of said iterative multi-phase converging process, said LLM iteratively determines and updates a Risk Score for said Security Alert Message by taking into account: (i) an alert-specific playbook that is generated automatically for said Security Alert Message, and (ii) the content of said Security Alert Message, and (iii) the meta-data of said Security Alert Message, and (iv) the organizational context that is related to said Security Alert Message;
   (d1) if a most-updated value of the Risk Score of said Security Alert Message is smaller than a pre-defined False Positive threshold value, then: marking said Security Alert Message as a False Positive alert message;
   (d2) if the most-updated value of the Risk Score of said Security Alert Message is greater than a pre-defined True Positive threshold value, then: marking said Security Alert Message as a True Positive alert message, and activating one or more pre-defined threat mitigation operations that are determined to be relevant to said Security Alert Message;
   (d3) if the most-updated value of the Risk Score of said Security Alert Message is not greater than said pre-defined True Positive threshold value, and is also not smaller than said pre-defined False Positive threshold value, then: automatically obtaining additional context information that is relevant to said Security Alert Message; automatically providing the additional context information to said LLM; prompting the LLM to update the Risk Score based on said additional context information; iteratively re-evaluating the Risk Score as (i) indicating a False Positive alert message, or as (ii) indicating a True Positive alert message, or (iii) being inconclusive and requiring at least one additional iteration of obtaining additional context data;
   (e) wherein obtaining the additional context information comprises:
      generating a follow-up question that is addressed to a particular user in the organization;
      sending said follow-up question to said particular user;
      receiving an answer from said particular user to said follow-up question;
      utilizing said answer as additional context by said LLM for updating the Risk Score for said Security Alert Message;
   (f) prior to generating the follow-up question to said particular user, performing at least one of:
   (f1) estimating by the LLM whether or not any additional context data, that would be relevant for evaluating said Security Alert Message, can be obtained from non-human information sources that are available to the organization; if, and only if, the LLM estimates that no additional context data, that would be relevant for evaluating said Security Alert Message, can be obtained from non-human information sources that are available to the organization, then generating the follow-up question to said particular user;
   (f2) checking by the LLM whether or not any follow-up questions, that were already posed to one or more users in said organization with regard to other security alert messages, and their respective answers as stored in a questions-and-answers database, are useful for updating the Risk Score for said Security Alert Message; if, and only if, the checking result is negative, then: generating the follow-up question to said particular user;
      wherein operations of said computerized method are implemented by utilizing at least: a hardware processor that is configured to electronically execute code, and a memory unit that is configured to electronically store code and to electronically store data.

2. The computerized method of claim 1,
wherein obtaining the additional context information comprises:
prompting the LLM to generate a follow-up question that the LLM estimates to trigger a response that can provide new useful context for re-evaluating said Security Alert Message;
based on said follow-up questions, instructing an automated Agent Unit to fetch a particular information item from an Organizational Context Database as a response to said follow-up question.

3. The computerized method of claim 1,
further comprising:
storing in a questions-and-answers database the follow-up question and the information item that the automated Agent Unit fetched from the Organizational Context Database, and re-using said particular information item for evaluating a subsequent, different, security alert message; and performing Retrieval-Augmented Generation (RAG) of prompts, that are fed into said LLM, based on content that was accumulated in said questions-and-answers database in previous automated investigations of previous alert messages.

4. The computerized method of claim 1,
further comprising:
storing in a questions-and-answers database the follow-up question item and said answer, and re-using said follow-up question and said answer for evaluating a subsequent, different, security alert message.

5. The computerized method of claim 1, comprising:
prompting said LLM to update the Risk Score for said Security Alert Message,
based on organizational context information that includes at least: (i) user data and account data from an Active Directory; (ii) data from organizational file systems and organizational data repositories; (iii) data from event logs of said organization.

6. The computerized method of claim 1,
wherein the organizational context information further comprises:
organizational context that was automatically calculated and derived from organizational data, and that describes Peer Groups among users of said organizations, generated using a peer group detection process that checks which users regularly interact with which other users in said organization.

7. The computerized method of claim 1,
wherein the organizational context information further comprises:
organizational context that describes at least: (i) users in said organization, and access privileges of each user to each resource of the organization; (ii) devices in said organization, and access privileges of each device to each resource of the organization.

8. The computerized method of claim 1,
wherein the organizational context information further comprises:
additional organizational context that is extracted from one or more of:
a Customer Relationship Management (CRM) system of said organization,
a Supply Chain Management (SCM) system of said organization,
an Enterprise Resource Planning (ERP) system of said organization,
an Active Directory of said organization.

9. The computerized method of claim 1, comprising:
fine-tuning said LLM, by modifying weights of parameters that said LLM uses, based on a specific dataset of correctly-evaluated security alert messages and their content and their meta-data.

10. The computerized method of claim 1,
comprising:
fine-tuning the LLM to generate relevant and accurate outputs in response to engineered prompts that command said LLM to perform a specific task of generating a Risk Score for an incoming Security Alert Message in a specific field of Security Domain.

11. The computerized method of claim 1,
comprising:
iteratively re-calculating and re-evaluating the Risk Score for said Security Alert Message, until the LLM converges to a decision that the Security Alert Message is either (i) a False Positive alert message or (ii) a True Positive alert message, in view of a False Positive threshold value and a True Positive threshold value.

12. A system comprising:
one or more hardware processors, that are configured to execute code,
and that are operably associated with one or more memory units that are configured to store code;
wherein the one or more hardware processors are configured to perform a computerized process comprising:
(a) receiving a Security Alert Message pertaining to a possible security-related incident pertaining to an organization;
(b) automatically evaluating whether the Security Alert Message is either (I) a False Positive security alert message or (II) a True Positive security alert message,
by performing an iterative multi-phase converging process in which a Large Language Model (LLM) evaluates at least: (i) content of said Security Alert Message, and (ii) meta-data of said Security Alert Message, and (iii) organizational context that is related to said Security Alert Message;
(c) wherein as part of said iterative multi-phase converging process, said LLM iteratively determines and updates a Risk Score for said Security Alert Message by taking into account: (i) an alert-specific playbook that is generated automatically for said Security Alert Message, and (ii) the content of said Security Alert Message, and (iii) the meta-data of said Security Alert Message, and (iv) the organizational context that is related to said Security Alert Message;
(d1) if a most-updated value of the Risk Score of said Security Alert Message is smaller than a pre-defined False Positive threshold value, then: marking said Security Alert Message as a False Positive alert message;
(d2) if the most-updated value of the Risk Score of said Security Alert Message is greater than a pre-defined True Positive threshold value, then: marking said Security Alert Message as a True Positive alert message, and activating one or more pre-defined threat mitigation operations that are determined to be relevant to said Security Alert Message;
(d3) if the most-updated value of the Risk Score of said Security Alert Message is not greater than said pre-defined True Positive threshold value, and is also not smaller than said pre-defined False Positive threshold value, then: automatically obtaining additional context information that is relevant to said Security Alert Message; automatically providing the additional context information to said LLM; prompting the LLM to update the Risk Score based on said additional context information; iteratively re-evaluating the Risk Score as (i) indicating a False Positive alert message, or as (ii) indicating a True Positive alert message, or (iii) being inconclusive and requiring at least one additional iteration of obtaining additional context data;

(e) wherein obtaining the additional context information comprises:

generating a follow-up question that is addressed to a particular user in the organization;

sending said follow-up question to said particular user;

receiving an answer from said particular user to said follow-up question;

utilizing said answer as additional context by said LLM for updating the Risk Score for said Security Alert Message;

(f) prior to generating the follow-up question to said particular user, performing at least one of:

(f1) estimating by the LLM whether or not any additional context data, that would be relevant for evaluating said Security Alert Message, can be obtained from non-human information sources that are available to the organization; if, and only if, the LLM estimates that no additional context data, that would be relevant for evaluating said Security Alert Message, can be obtained from non-human information sources that are available to the organization, then generating the follow-up question to said particular user;

(f2) checking by the LLM whether or not any follow-up questions, that were already posed to one or more users in said organization with regard to other security alert messages, and their respective answers as stored in a questions-and-answers database, are useful for updating the Risk Score for said Security Alert Message; if, and only if, the checking result is negative, then: generating the follow-up question to said particular user.

13. A non-transitory storage medium having stored thereon instructions that, when executed by a machine, cause the machine to perform a computerized method for automatically generating Incident Reports for an organization that receives incoming alert messages, the method comprising:

(a) receiving a Security Alert Message pertaining to a possible security-related incident pertaining to an organization;

(b) automatically evaluating whether the Security Alert Message is either (I) a False Positive security alert message or (II) a True Positive security alert message, by performing an iterative multi-phase converging process in which a Large Language Model (LLM) evaluates at least: (i) content of said Security Alert Message, and (ii) meta-data of said Security Alert Message, and (iii) organizational context that is related to said Security Alert Message;

(c) wherein as part of said iterative multi-phase converging process, said LLM iteratively determines and updates a Risk Score for said Security Alert Message by taking into account: (i) an alert-specific playbook that is generated automatically for said Security Alert Message, and (ii) the content of said Security Alert Message, and (iii) the meta-data of said Security Alert Message, and (iv) the organizational context that is related to said Security Alert Message;

(d1) if a most-updated value of the Risk Score of said Security Alert Message is smaller than a pre-defined False Positive threshold value, then: marking said Security Alert Message as a False Positive alert message;

(d2) if the most-updated value of the Risk Score of said Security Alert Message is greater than a pre-defined True Positive threshold value, then: marking said Security Alert Message as a True Positive alert message, and activating one or more pre-defined threat mitigation operations that are determined to be relevant to said Security Alert Message;

(d3) if the most-updated value of the Risk Score of said Security Alert Message is not greater than said pre-defined True Positive threshold value, and is also not smaller than said pre-defined False Positive threshold value, then: automatically obtaining additional context information that is relevant to said Security Alert Message; automatically providing the additional context information to said LLM; prompting the LLM to update the Risk Score based on said additional context information; iteratively re-evaluating the Risk Score as (i) indicating a False Positive alert message, or as (ii) indicating a True Positive alert message, or (iii) being inconclusive and requiring at least one additional iteration of obtaining additional context data;

(e) wherein obtaining the additional context information comprises:

generating a follow-up question that is addressed to a particular user in the organization;

sending said follow-up question to said particular user;

receiving an answer from said particular user to said follow-up question;

utilizing said answer as additional context by said LLM for updating the Risk Score for said Security Alert Message;

(f) prior to generating the follow-up question to said particular user, performing at least one of:

(f1) estimating by the LLM whether or not any additional context data, that would be relevant for evaluating said Security Alert Message, can be obtained from non-human information sources that are available to the organization; if, and only if, the LLM estimates that no additional context data, that would be relevant for evaluating said Security Alert Message, can be obtained from non-human information sources that are available to the organization, then generating the follow-up question to said particular user;

(f2) checking by the LLM whether or not any follow-up questions, that were already posed to one or more users in said organization with regard to other security alert messages, and their respective answers as stored in a questions-and-answers database, are useful for updating the Risk Score for said Security Alert Message; if, and only if, the checking result is negative, then: generating the follow-up question to said particular user.

* * * * *